United States Patent
Mellier et al.

(10) Patent No.: US 8,867,305 B2
(45) Date of Patent: Oct. 21, 2014

(54) METHOD OF ASSISTING THE DEPLOYMENT/RETRIEVAL OF LINEAR ACOUSTIC ANTENNAS TOWED BY A VESSEL, DURING THE COURSE OF WHICH DISTANCE-MEASURING MEANS CARRIED BY THE ANTENNAS COMMUNICATE WITH ONE ANOTHER

(75) Inventors: Gaëtan Mellier, Nantes (FR); Gilles Poete, Saffre (FR)

(73) Assignee: Sercel, Carquefou (FR)

( * ) Notice: Subject to any disclaimer, the term of this patent is extended or adjusted under 35 U.S.C. 154(b) by 1472 days.

(21) Appl. No.: 12/133,456

(22) Filed: Jun. 5, 2008

(65) Prior Publication Data
US 2008/0304358 A1  Dec. 11, 2008

(30) Foreign Application Priority Data
Jun. 7, 2007 (FR) .................................. 07 04062

(51) Int. Cl.
*G01V 1/38* (2006.01)
*H01Q 1/04* (2006.01)
(52) U.S. Cl.
CPC ................ *H01Q 1/04* (2013.01); *G01V 1/3835* (2013.01); *G01V 1/3843* (2013.01)
USPC .............................. 367/19; 367/16; 367/130
(58) Field of Classification Search
USPC ....................................... 367/15–20, 106, 130
See application file for complete search history.

(56) References Cited

U.S. PATENT DOCUMENTS

| | | | | |
|---|---|---|---|---|
| 4,912,684 A | * | 3/1990 | Fowler | 367/76 |
| 4,992,990 A | * | 2/1991 | Langeland et al. | 367/19 |
| 5,353,223 A | * | 10/1994 | Norton et al. | 702/17 |
| 5,668,775 A | * | 9/1997 | Hatteland | 367/19 |
| 6,697,300 B1 | | 2/2004 | Holt | |
| 7,376,045 B2 | * | 5/2008 | Falkenberg et al. | 367/19 |
| 7,518,951 B2 | * | 4/2009 | Solheim et al. | 367/130 |
| 7,701,803 B2 | * | 4/2010 | Welker | 367/17 |
| 7,778,109 B2 | * | 8/2010 | Storteig et al. | 367/16 |
| 2003/0012083 A1 | | 1/2003 | Brunet | |
| 2009/0316525 A1 | * | 12/2009 | Welker | 367/19 |

FOREIGN PATENT DOCUMENTS

| | | |
|---|---|---|
| EP | 0308222 | 3/1989 |
| GB | 2287829 | 9/1996 |
| WO | WO-02/103393 | 12/2002 |
| WO | WO-2005/096018 | 10/2005 |

OTHER PUBLICATIONS

French Search Report, Jan. 15, 2008, 2 pages.

* cited by examiner

*Primary Examiner* — Ian J Lobo
(74) *Attorney, Agent, or Firm* — David D. Brush; Westman, Champlin & Koehler, P.A.

(57) ABSTRACT

A method of assisting the deployment/retrieval of linear acoustic antennas towed by a vessel, said linear antennas each having geophysical data sensors, means for measuring the distance of at least one adjacent linear antenna, during the course of which at least one of said linear acoustic antennas has at least longitudinal mobility in relation to said vessel, including: at least one phase for configuring cells (Cn) each defined by a central position corresponding to a distance-measuring means (T), and by at least one peripheral position corresponding to another distance-measuring means (T) in proximity to said distance-measuring means (T) for said central position, reference distances between said central positions and said peripheral positions being predetermined; and at least one phase for controlling said central and peripheral positions with respect to said reference distances, by establishing communication between at least some of said distance-measuring means (T).

11 Claims, 3 Drawing Sheets

METHOD OF ASSISTING THE DEPLOYMENT/RETRIEVAL OF LINEAR ACOUSTIC ANTENNAS TOWED BY A VESSEL, DURING THE COURSE OF WHICH DISTANCE-MEASURING MEANS CARRIED BY THE ANTENNAS COMMUNICATE WITH ONE ANOTHER

CROSS-REFERENCE TO RELATED APPLICATIONS

This application claims the benefit of French Patent Application No. FR 07/04062, filed on Jun. 7, 2007, which application is hereby incorporated by reference in its entirety.

BACKGROUND OF THE INVENTION

1. Field of the Invention

The field of the invention is that of seismic data acquisition. More precisely, the invention relates to seabed analysis equipment.

In particular, the invention relates to the seismic oil exploration industry, but can apply to any field implementing a seismic data acquisition network in a marine environment.

2. Related Technology

On-site geophysical data acquisition operations conventionally implement sensor arrays (designated by the term "hydrophones," in connection with data acquisition in a marine environment).

In order to collect geophysical data in a marine environment, one or more underwater seismic sources are activated in order to propagate omnidirectional seismic wave trains.

The sources currently being implemented to conduct seismic surveys are air guns.

The wave trains generated are sensed by the aforementioned hydrophones, which are distributed along cables in order to form linear acoustic antennas commonly designated by the term "streamer".

Acquisition of seismic data in an environment is conventionally carried out with the assistance of a series of streamers towed by a vessel.

Each streamer may include a head buoy and a tail buoy with which means for global positioning by satellite are associated, for the purpose of accurately tracking each stream.

This tracking of the streamers is important, in particular for:
  following the position of the hydrophones in order to obtain an adequately precise image of the seabed;
  detecting the movements of the streamers in relation to one another;
  following the navigation of the streamers, in particular in the situation wherein an obstacle such as an oil barge is circumnavigated.

It is noted that streamers include an assembly of sections generally having a length of approximately 150 meters, the streamers having a total possible length of several kilometers (conventionally 6 to 7 kilometers).

In actual practice, it is sought to conduct analysis of a seabed with a minimum number of passes of the vessel over the zone concerned. To accomplish this, the width of the sensor array is increased as much as possible, which involves the implementation of a significant number of streamers.

The tracking of streamers is therefore a particularly sensitive issue, taking into account the length and number thereof.

As a matter of fact, the streamers are subjected to various external stresses varying in nature and importance, such as the wind, waves, currents . . . .

These stresses regularly result in relative movements of the streamers, at the risk of them becoming entangled with one another, which can cause more or less consequential damage to the streamers.

Currently, one solution attempting to control the respective positions of the streamers is based on the implementation of navigational control devices (commonly designated by the term airplane or "birds") such as those described in the patent document published under the number FR-2 870 509.

These devices include a body equipped with pivoting wings enabling the position of the streamer to be modified laterally.

Furthermore, the "birds" can be equipped with pressure sensors for detecting variations in depth and for bringing the streamer to a predetermined depth.

Additionally, the set of "birds" is piloted by a centralized system such as the one described in the patent document published under the number WO-02/103393.

According to this technique, active controllers (acoustic transducers, GPS devices . . . ) are evenly distributed along the streamers and the signals supplied by these controllers are transmitted to a master controller present on the survey vessel.

The master controller centralizes and processes the data for the purpose of comparing it to a predetermined configuration. To accomplish this, the active controllers, and in particular the acoustic transducers, are labelled as cells: one cell includes a transducer considered to be central for the cell in question, and of several peripheral transducers on the streamer or streamers immediately adjacent to the one carrying the central transducer, distances being established for each position of the peripheral transducers relative to the central transducer.

On the basis of the comparison result between the predetermined configuration and the actual configuration, the master controller returns instructions to the birds distributed along the streamers for the purpose of modifying the positions thereof.

SUMMARY OF THE INVENTION

The objective of the invention, in particular, is to mitigate the disadvantages of the prior art.

More precisely, the objective of the invention is to propose a technique for assisting the deployment/retrieval of an array of streamers which significantly limits the risks of collision or entanglement of the streamers with one another, compared with the known deployment/retrieval methods of the prior art.

Another objective of the invention is to provide a technique which eliminates, or at the very least limits, human interventions on the array of streamers during the deployment/retrieval thereof.

Another objective of the invention is to provide a technique such as this which is simple in design and easy to implement.

These objectives, as well as others which will become apparent hereinbelow, are accomplished on account of the invention, the subject matter of which is a method of assisting the deployment/retrieval of linear acoustic antennas towed by a vessel, said linear antennas each having geophysical data sensors, means for measuring the distance of at least one adjacent linear antenna, during the course of which at least one of said linear acoustic antennas has at least longitudinal mobility in relation to said vessel, characterised in that it includes:
  at least one phase for configuring cells each defined by a central position corresponding to a distance-measuring means, and by at least one peripheral position corresponding to another distance-measuring means in proximity to said distance-measuring means for said central position, reference distances between said central positions and said peripheral positions being predetermined;

at least one phase for controlling said central and peripheral positions with respect to said reference distances, by establishing communication between at least some of said distance-measuring means.

It is thereby possible to accurately and regularly control the evolution of the streamer positions and, as a result, to anticipate situations in which streamers become entangled and/or collide with one another.

According to one advantageous solution, it is noted that the method provides for a continuous power supply to the distance measuring means by means of a power cable which is built into the streamers and connected to a generator present on the vessel.

Based on the situations, the method can advantageously include at least one phase for repositioning at least one of said linear antennas with the aid of said navigational control means.

In this way, the navigational control means act on the positioning of the streamers, if need be, as deviations from the reference distances become detected.

It is understood that, on smaller craft, it is thus possible to avoid involving men in order to untangle the acoustic antennas during malfunctions, which constitutes a considerable advantage in terms of safety.

According to one preferred solution wherein said antennas further include navigation control means distributed over the length of said linear antennas in order to act at least laterally on the position of said linear antennas, said repositioning step is carried out with the assistance of closed-loop control means for said navigation control means, said closed-loop control means being distributed over the length of said linear antennas and intended to communicate locally with said distance-measuring means for the purpose of collecting and processing data provided by said distance-measuring means and, on the basis of said data, to operate said control means.

In this way, a system for tracking and positioning streamers is obtained, which is significantly more responsive than the techniques of the prior art.

As a matter of fact, the distribution of the closed-loop control means along the streamers enables these means to be placed in the immediate vicinity of the distance-measuring means and navigational control means.

Thus, the times for routing data between the distance-measuring means and the closed-loop control means are considerably limited, as well as the times for routing instructions between the closed-loop control means and the distance-measuring means.

In other words, the detected position of a streamer is the same as that of the streamer at the moment when the instruction sent to the control means is executed, which ensures reliable positioning of the streamers.

Furthermore, processing of data is ensured by a plurality of closed-loop control means distributed along the streamers, which makes it possible:

to avoid implementing heavy and costly centralized processing means on the towing vessel;

to continue to exercise control of certain streamers in the event of failure of one or more of the closed-loop control means.

During said repositioning phase, said navigational control means advantageously act on the depth and/or the lateral positioning of said linear antennas.

According to one advantageous embodiment, said configuration step is carried out so as to define a plurality of cells, each including a distance-measuring means for one primary linear antenna and at least two distance-measuring means out of at least one among two linear antennas adjacent to said primary linear antenna.

According to another characteristic, said configuration step is carried out so as to define a plurality of cells and to modify, for at least some of said cells, the number of distance-measuring means used on at least one among two antennas adjacent to said primary linear antenna.

The method advantageously includes at least one step for reconfiguring said cells, which is capable of being initiated:

by an operator;

semi-automatically or automatically based on at least one of the data sets belonging to the following group:

deployment/retrieval information from the distance-measuring means along said linear antenna;

deployment/retrieval information from said linear antenna;

analysis of distance information provided by the distance-measuring means.

According to one particular situation, for a curved course of said vessel, the method includes at least one step for reconfiguring said cells, aiming to modify said reference distances.

According to another particular situation, during an isolated deployment/retrieval phase for one of said acoustic antennas, the method includes at least one step for reconfiguring said cells wherein the distance-measuring means for the acoustic linear antenna, which is the subject of said isolated deployment/retrieval, are used only as receivers for acoustic signals transmitted by the distance-measuring means of the adjacent linear antennas.

DETAILED DESCRIPTION

Figure 1:
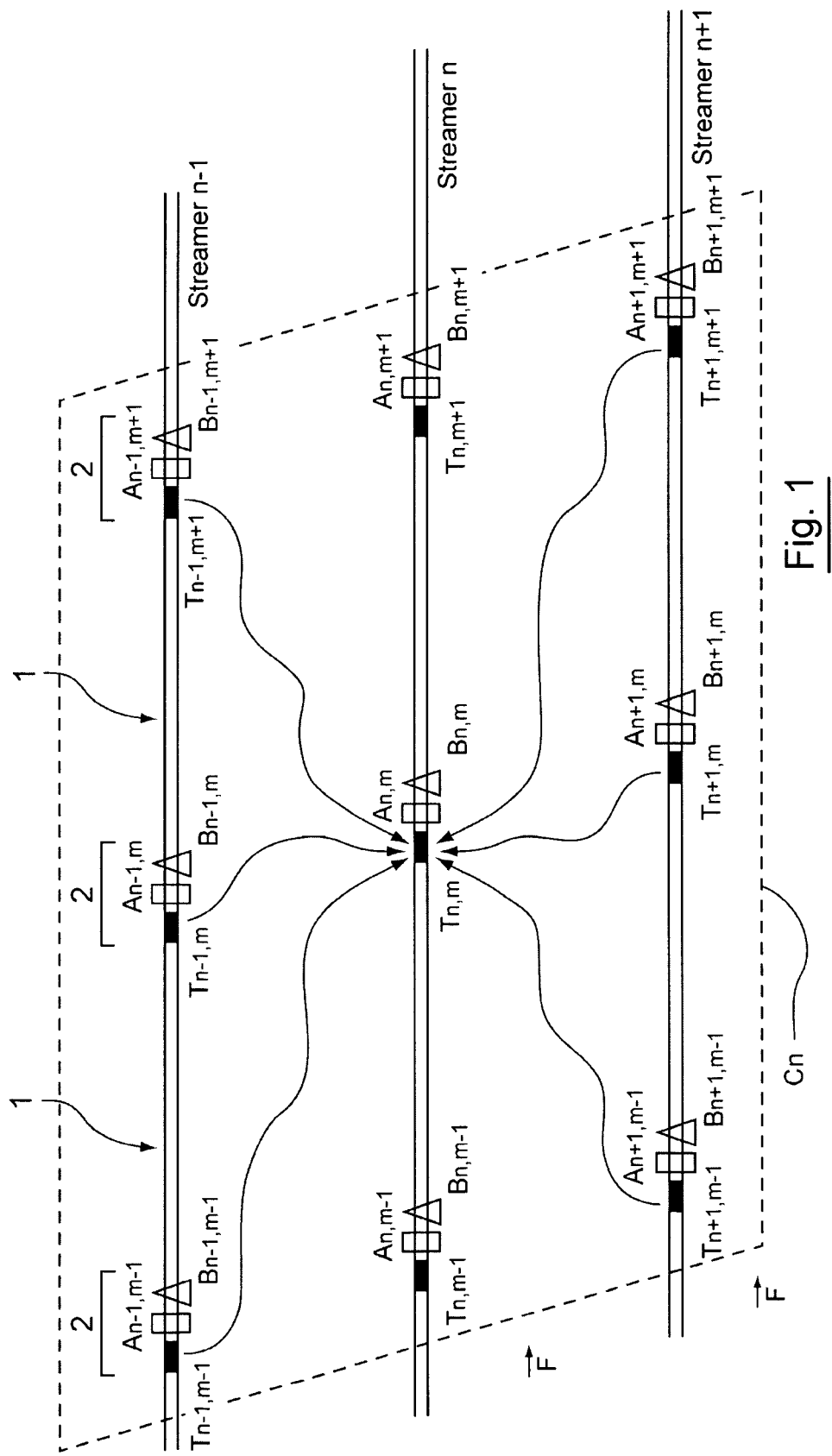
FIG. 1 is a schematic illustration of a deployment phase for a array of streamers.

The centralized processing of data in conventional geophysical data acquisition operations has several disadvantages, including:

the processed data is copious and requires high-performance and thus costly processing means (master controller);

the data retrieval and processing times as well as the instruction routing times can lead to real-time delays between the detected position and the actual position at the time of instruction return;

in the case of a master controller failure, it is no longer possible to exercise any control over the position of the streamers.

It is noted that the active controllers (acoustic transducers, GPS devices . . . ) evenly distributed along the streamers are each associated with a stand-alone power supply battery.

Furthermore, currently during deployment (or retrieval) of the streamers, the positioning of the streamers is not accurately controlled.

As a matter of fact, the current systems do not support any dynamic configuration mode for the acoustic cells, but only a static mode wherein the cells are predefined by the distances separating the peripheral transducers from the central transducer, and, as indicated previously, these distances are fixedly parameterised and correspond to an ideal configuration.

Such being the case, during the deployment/retrieval or turning phases, the distances are not fixed (on the contrary, they vary considerably). Consequently, comparison of the actual configuration in relation to a predetermined configuration using the technique of controlling the cells defined by transducer positions and fixed distances between these transducers is inadequate for the deployment/retrieval or turning phases.

Thus, the users do not activate the external power supplies of the acoustic transducers in order to save the stand-alone power supply batteries. As a matter of fact, knowing that a deployment phase for a array of streamers can take place over a period of 24 hrs to 48 hrs, and that the acoustic transducers are not used to control the position of the streamers during this phase, the power supply to the transducers is cut off, with a view to saving the battery thereof, this being done to ensure complete autonomy of the batteries during the seismic data acquisition phase.

Therefore, during the deployment/retrieval or turning phases, other streamer positioning indicators are active, such as compasses (distributed along the streamers) or GPS receivers positioned on tail and head streamer buoys.

However, the information provided by these other indicators is insufficient to reliably control the positioning of the array of streamers.

In order to prevent entanglement of the streamers and/or possible collisions between the tail buoys of the streamers, a "staggered" deployment of the streamers is conventionally implemented.

According to this technique, a streamer is deployed over a length substantially greater (or less) than the deployment length of the streamer which is immediately adjacent thereto. Thus, the deployment of the streamers is carried out such that two adjacent streamers have a deployed length offset equivalent to one section (or more).

In the same way, the lateral positioning of the streamers is also acted upon, by imposing a width upon the entire array of streamers, using two floating wings called paravanes.

Despite these arrangements, there are times when, during deployment of the array of streamers, it is observed that some of them become entangled, this being due in particular, to the winds and/or the waves and/or the sea currents.

It is then necessary for men to be sent onto smaller craft, called "workboats," in order to attempt to separate the streamers for the purpose of enabling deployment to be continued, or even to enable recovery of a streamer that has been damaged.

Of course, these human interventions are particularly perilous and therefore present risks to the men brought to move about on equipment weighing several tons.

The same problem with respect to the relative positioning of the streamers also occurs during retrieval of a faulty streamer: the power supply to the active controllers is cut off during the recovery thereof.

The present invention addresses these disadvantages of the prior art. Other characteristics and advantages of the invention will become more apparent upon reading the following description of a preferred embodiment of the invention, given for non-limiting and illustrative purposes, and of the appended drawings.

As indicated previously, during deployment of a array of linear acoustic antennas (or during retrieval of one or more of same), the principle of the invention is based on the fact of providing for the establishment of communication between the distance-measuring means carried by the antennas, so as to control the positions of the antennas in relation to reference positions and distances corresponding to cells that have been predefined during a configuration phase.

In the following description, the term "streamer" designates a towed linear acoustic antenna.

FIG. 1 shows an array of streamers being deployed (in the direction indicated by the arrow F).

According to the deployment mode shown, the streamers are deployed with a deployed length offset in relation to one another (streamer n+1 has a deployed length greater than that of streamer n, itself having a deployed length greater than that of streamer n−1 . . . ).

Each streamer includes evenly distributed (e.g., every 300 meters (or ever 2 sections)) distance-measuring means T and navigational control means B, the latter, according to this embodiment, being "birds," e.g., such as those described by the patent document published under the number FR-2 870 509.

The distance-measuring means use an acoustic measurement system. This acoustic measurement is bidirectional.

Furthermore, an electrical power cable is built into the sheathing of the streamers so as to power all of the components distributed on the streamers, and in particular the distance-measuring means, from a generator on-board the towing vessel (which avoids using the stand-alone batteries).

According to this embodiment, the measuring means are acoustic transducers which communicate with one another such that, at various moments, the transducers $T_{n-1,m-1}$; $T_{n-1,m}$; $T_{n-1,m+1}$ of a streamer n−1 and the transducers $T_{n+1,m-1}$; $T_{n+1,m}$; $T_{n+1,m+1}$ of a streamer n+1 each transmit a signal for the transducer $T_{n,m}$ of a streamer n.

To accomplish this, each transducer includes means of transmitting and means of receiving an acoustic signal.

The measurement of distance between the pieces of equipment is carried out by any appropriate acoustic measuring technique known by those skilled in the art.

According to the principle of the invention, the method of assisting the deployment (or retrieval) of the streamers includes a step (aided by computer software means) for configuring a plurality of cells Cn each defined by:

a central position corresponding to the position of a transducer $T_{n,m}$ of a streamer n;

peripheral positions corresponding to other transducers in the vicinity of transducer $T_{n,m}$: in the case significant longitudinal and/or lateral offsets between streamers, each cell is advantageously defined by at least two, preferably three, or even four or more transducers of each streamer adjacent to transducer $T_{n,m}$, namely transducers $T_{n-1,m-1}$; $T_{n-1,m}$; $T_{n-1,m+1}$ and transducers $T_{n+1,m-1}$; $T_{n+1,m}$; $T_{n+1,m+1}$ of streamer n−1 and streamer n+1, respectively.

It is understood that cell configuration step (or that a cell reconfiguration step) can also include defining (modifying) the number of peripheral transducers taken into account in the definition of a cell.

The method thus offers a large degree of flexibility, in that it enables the configuration of the cells to be adapted to the situation (isolated or non-isolated deployment, isolated or non-isolated retrieval, turning . . . ).

Furthermore, reference distances between the central positions and the peripheral positions are specified. Typically, it is attempted to maintain a spacing of approximately 100 meters between the streamers, the reference distances being calculated accordingly (in particular, on the basis of the spacing between transducers), the tendency, however, being to reduce this spacing to values of the order of 30 to 50 meters.

During the course of deployment (or retrieval) of the streamers, measurement of the positions of the streamers relative to one another is thus carried out gradually by analysis of the central and peripheral positions in relation to the reference distances, this being done for each cell Cn, in synchronized fashion, and over the entire array of streamers.

In addition, in the case of synchronization of the various components of the system, this synchronization can be ensured by a controller on-board the towing vessel.

More precisely, a synchronization order is sent to all of the transducers T, this order having the capability of including a transmitting order, a receiving order or an idle mode order.

The distance measurements are carried out for the transducers concerned, the corresponding data being stored by the transducers having received a receiving order.

The cycle is repeated with other transducers until all of the transducer positions are mapped and all are analyzed by an operator on the boat, thus providing a precious decision-making tool.

If the mapping of the array of streamers shows that some of them deviate from the reference distances, the most well-positioned "birds" can be used to bring the corresponding streamer or streamers back to the reference distance or distances.

It is noted that the "birds" (or any other navigation control means for the streamers) are capable of correcting the position of the streamers, by imparting a lateral movement thereto and/or a variation in the position thereof, depending on the depth of same in the water.

In addition, based on the evolution of the deployment (or retrieval) of the streamers and/or the mapping of the array, steps for reconfiguring the cells Cn are carried out, the relative positions of the transducers having been modified, for example, to the point of having to declare new transducers in peripheral positions for a transducer in central position.

A reconfiguration step such as this can be initiated:
by an operator;
on the basis of deployment information provided by an on-board system, and used by an operator who initiates and/or validates the reconfiguration of the cells: this information can be obtained by an operator who positions a bird on a streamer (in deployment phase from the deck of the boat), and who declares, via an action on a graphic interface, the acoustic node/bird to have been deployed, i.e., as being ready to go into the water;
automatically: on the basis of deployment information from the distance-measuring means or deployment information from the linear antennas: the "winches" (deployment/retrieval drums for the streamers) are then equipped with means of measuring the deployment/retrieval rate and/or length of the streamers and provide measurement signals to calculating means which determine the activation of cell reconfiguration; this information corresponds either to a deployed distance of the streamer, or to a deployment rate. It can be provided by the winches or any other means on-board or built-into the streamer (GPS, compass . . . );
automatically: on the basis of the analysis of the actual acoustic distance measurements of the system (relative positioning of the streamers in relation to one another): in this case, the system analyzes all of the acoustic distances at its disposal and automatically adapts the array.

In actual practice, these reconfiguration steps are carried out repeatedly and iteratively.

Figure 3:
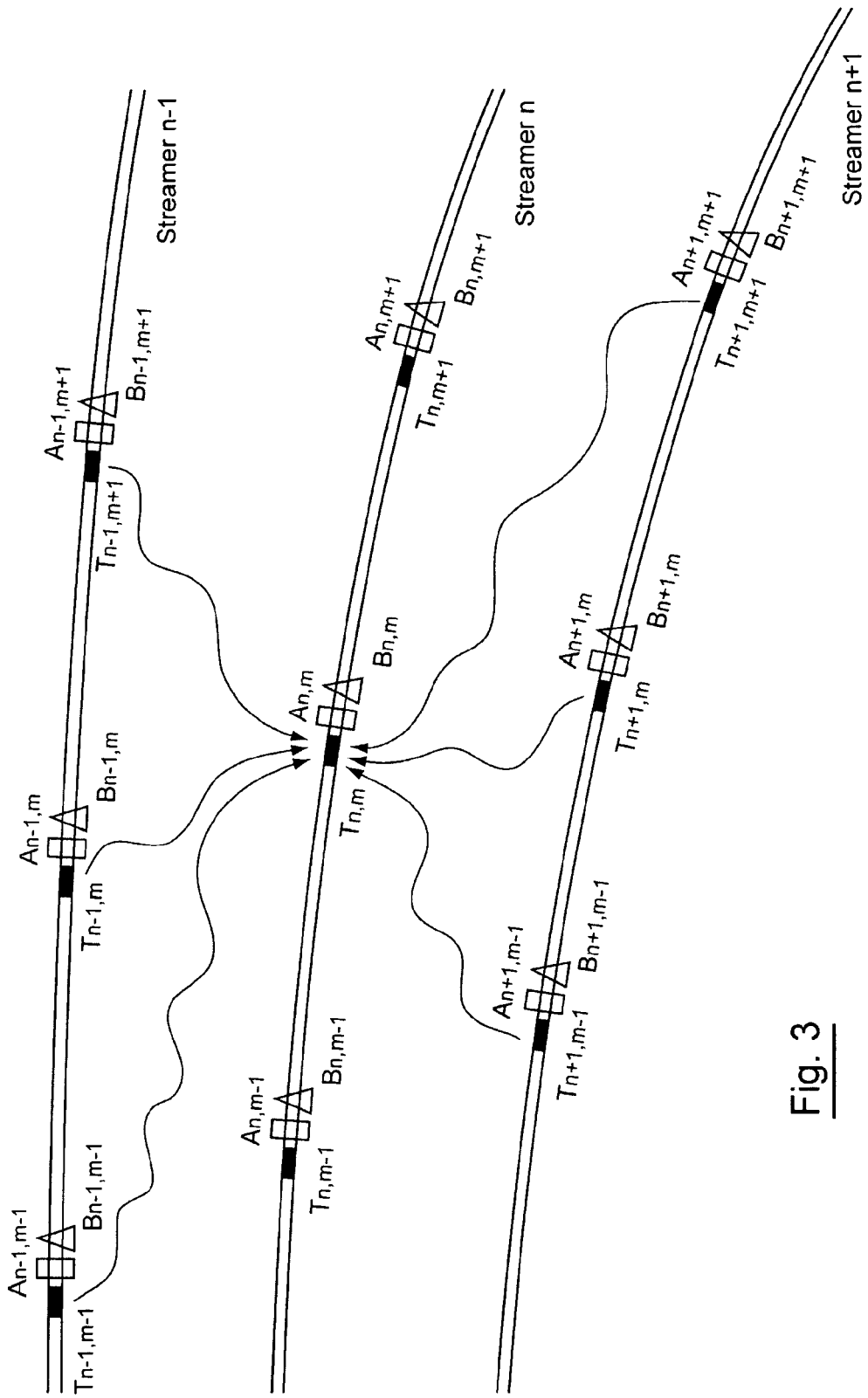
FIG. 3 is a schematic illustration of an array of streamers in a turning configuration.

In particular, in the particular case of a turning course of the vessel, as shown schematically in FIG. 3, this or these reconfiguration steps can also include redefining the reference distances. As a matter of fact, during turning courses, the streamers tend to move away from one another as the distance from the towing vessel increases. Consequently, the cells tend to become larger and it is necessary to take this aspect into consideration in the configuration thereof, by modifying the reference distances.

Another reconfiguration phase can again be carried out in another particular case, involving the isolated deployment/retrieval of a streamer from an existing array.

Figure 2:
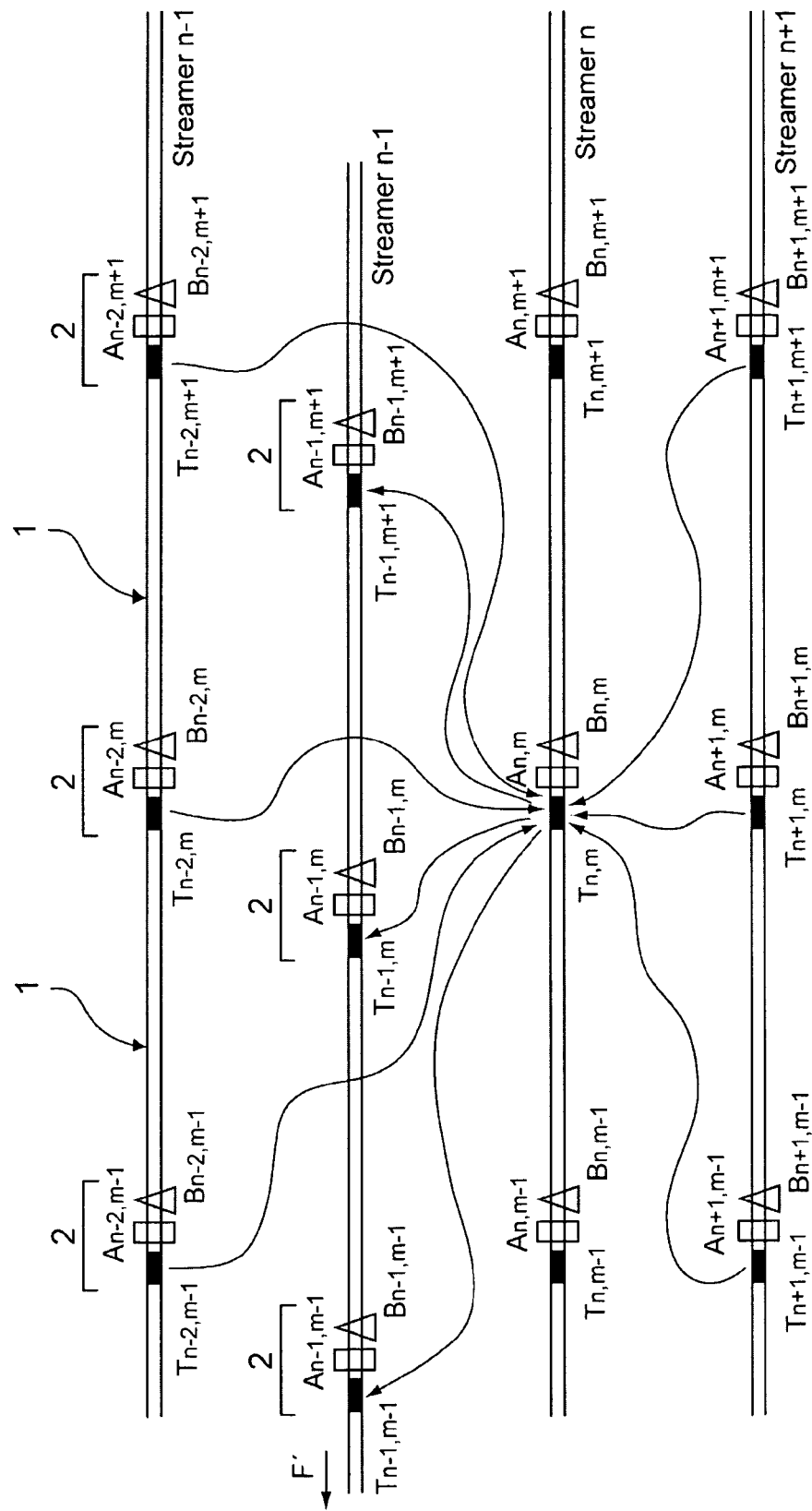
FIG. 2 is a schematic illustration of a retrieval phase for a array of streamers.

In this case, the streamer in question is deployed/retrieved in "phantom" mode: the transducers that it carries are rendered "passive" for mapping the array of streamers and, in configuring the cells, account is taken of the positions of the transducers carried by the streamer which is immediately adjacent thereto. Thus, in the example of FIG. 2, since streamer n−1 is being retrieved in the direction indicated by the arrow F, transducers $T_{n-1,m-1}$; $T_{n-1,m}$; $T_{n-1,m+1}$ . . . are configured as receivers only, the acoustic signals emitted by the adjacent streamers enabling the positioning of the streamer to be controlled during retrieval. In the same way, in configuring the cells, the latter are reconfigured such that, for a cell having the transducer $T_{n,m}$ as the central position, the positions considered to be peripheral, which are occupied by transducers $T_{n-1,m-1}$; $T_{n-1,m}$; $T_{n-1,m+1}$ are substituted by the positions occupied by transducers $T_{n-2,m-1}$; $T_{n-2,m}$; $T_{n-2,m+1}$. Of course, the corresponding reference distances are likewise redefined.

According to a preferred implementation of the invention, each streamer also carries closed-loop control means A, distributed over the length of the streamer and placed in the vicinity of a "bird," whereby the closed-loop control means $A_{n,m-1}$; $A_{n,m}$; $A_{n,m+1}$ of a streamer A communicate locally with the "birds" $B_{n,m-1}$; $B_{n,m}$; $B_{n,m+1}$ of the same streamer, respectively, after processing of the data transmitted by the array of adjacent transducers.

It is understood that the transducers T communicate with one another so as to determine the respective positions thereof, and then transmit the data relating to the position of same to the closed-loop control means A corresponding locally thereto ($A_{n,m+1}$ for transducer $T_{n,m+1}$; $A_{n,m}$ for $T_{n,m}$; . . . ), the latter transmitting an instruction to the corresponding bird ($B_{n,m+1}$ for the closed-loop control means $A_{n,m+1}$; $B_{n,m}$ for $A_{n,m}$; . . . ).

In this way, the streamers can be kept at a desired distance from one another, the closed-loop control means A being configured to keep this distance in a straight-line configuration, like the one shown in FIG. 1, as well as in a turning configuration, like the one shown in FIG. 3.

It is noted that the streamers include the assembly of sections 1 some of these sections of which are interconnected via connecting elements 2.

According to a preferred solution, each connecting element integrates an embedded electronics system including closed-loop control means A, and carries a bird B. The connecting elements also have electrical connectors so as to enable power to be progressively supplied to the sections, from an electrical generator on-board the towing vessel.

Furthermore, transducers T are mounted on the sections in the vicinity of each connecting element, e.g., at a distance of approximately 30 cm (these being similarly capable of being integrated directly into the connecting elements according to one foreseeable alternative).

According to one preferred embodiment, pressure sensors are integrated into the connecting elements so as to measure the depth of the streamer at the location of the bird in question.

The depth-related data is transmitted to processing means carried by the streamers, these processing means enabling a projection of the position of the transducers in a horizontal plane to be produced by means of an appropriate algorithm.

According to one preferred embodiment, these means of processing depth-related data are integrated into the embedded electronics system of the connecting elements.

Furthermore, the connecting elements each carry (or only some of them) a compass enabling acquisition of bearing information. This information, combined with that relating to the positions of the transducers, may enable repositioning of the streamers to be optimized by detecting the configuration of the streamers relative to one another (in a straight line or when turning).

What is claimed is:

1. A method of comprising:
   assisting a deployment and/or retrieval of linear acoustic antennas towed by a vessel, said linear antennas each having geophysical data sensors and means for measuring the distance of at least one adjacent linear antenna, during which at least one of said linear acoustic antennas has at least longitudinal mobility in relation to said vessel, including:
      at least one phase of configuring a network of a plurality of cells, each cell comprising the distance-measuring means of a primary one of the linear acoustic antennas and at least two distance-measuring means on at least one of the linear antennas adjacent to said primary linear acoustic antenna, each cell having a predefined dimension defined by a central position corresponding to the distance-measuring means of the primary linear acoustic antenna, and by at least two peripheral positions corresponding to the at least two distance-measuring means of the at least one adjacent linear acoustic antenna in proximity to said central position, wherein said distance measuring means are evenly distributed along said linear acoustic antennas and reference distances between said central positions and said peripheral positions are predetermined; and
      at least one phase of controlling said central and peripheral positions with respect to said predetermined reference distances, by establishing communication between at least some of said distance-measuring means,
   wherein during deployment and/or retrieval of said linear acoustic antennas, positioning of said primary linear acoustic antenna relative to said at least one adjacent linear acoustic antenna is carried out by analysis of said central and peripheral positions relative to said predetermined reference distances.

2. The method of assisting the deployment/retrieval of linear acoustic antennas of claim 1, wherein said antennas further include navigational control means distributed over the length of said linear antennas in order to act at least laterally on the position of said linear antennas, and wherein the method includes at least one phase of repositioning at least one of said linear antennas with the assistance of said navigational control means.

3. The method of assisting the deployment/retrieval of linear acoustic antennas of claim 2, wherein said repositioning phase is carried out with assistance of closed-loop control means for said navigation control means, said closed-loop control means being distributed over the length of said linear antennas and configured to communicate locally with said distance-measuring means for the purpose of collecting and processing data provided by said distance-measuring means and, on the basis of said data, to operate said control means.

4. The method of assisting the deployment/retrieval of linear acoustic antennas as claimed in claim 2, wherein, during said repositioning phase, said navigational control means act on the depth and/or the lateral positioning of said linear antennas.

5. The method of assisting the deployment/retrieval of linear acoustic antennas of claim 1, wherein said configuration phase is carried out so as to define the plurality of cells and to modify, for at least some of said cells, the number of distance-measuring means used on at least one among two antennas adjacent to said primary linear acoustic antenna.

6. The method of assisting the deployment/retrieval of linear acoustic antennas as claimed in claim 1, including at least one step of reconfiguring said cells.

7. The method of assisting the deployment/retrieval of linear acoustic antennas of claim 6, wherein said at least one reconfiguration step is initiated by an operator.

8. The method of assisting the deployment/retrieval of linear acoustic antennas of claim 6, wherein said at least one reconfiguration step is initiated semi-automatically or automatically based on at least one of the data sets selected from the group consisting of:
   deployment/retrieval information from the distance-measuring means along said linear antenna;
   deployment/retrieval information from said linear antenna; and
   analysis of distance information provided by the distance-measuring means.

9. The method of assisting the deployment/retrieval of linear acoustic antennas as claimed in claim 1, wherein the method includes at least one step of reconfiguring said cells, to modify said reference distances for a curved course of said vessel.

10. The method of assisting the deployment/retrieval of linear acoustic antennas as claimed in claim 1, wherein, during an isolated deployment/retrieval phase for one of said linear acoustic antennas, the method includes at least one step of reconfiguring said cells wherein the distance-measuring means for the linear acoustic antenna, which is the subject of said isolated deployment/retrieval, are used only as receivers for acoustic signals transmitted by the distance-measuring means of the adjacent linear acoustic antennas.

11. A method comprising:
   assisting a deployment and/or retrieval of linear acoustic antennas towed by a vessel, said linear acoustic antennas each having geophysical data sensors and acoustic transducers configured to measure a distance between adjacent ones of the linear antennas, wherein during deployment and/or retrieval at least one of said linear acoustic antennas has at least longitudinal mobility in relation to said vessel, and wherein assisting comprises:
      at least one phase of configuring a network of a plurality of cells, each cell comprising an acoustic transducer of a primary one of the linear acoustic antennas and at least two acoustic transducers on at least one of the linear antennas adjacent to said primary linear acoustic antenna, each cell having a predefined dimension defined by a central position corresponding to the acoustic transducer of the primary linear acoustic antenna, and by at least two peripheral positions corresponding to the at least two acoustic transducers of the at least one adjacent linear acoustic antenna in proximity to said central position, wherein said acoustic transducers are evenly distributed along said linear acoustic antennas and reference distances between said central positions and said peripheral positions are predetermined; and
      at least one phase of controlling said central and peripheral positions with respect to said predetermined reference distances, by establishing communication between at least some of said acoustic transducers, wherein during deployment and/or retrieval of said linear acoustic antennas, positioning of said primary linear acoustic antenna relative to said at least one adjacent linear acoustic antenna is carried out by analysis of said central and peripheral positions relative to said predetermined reference distances.

* * * * *